Jan. 26, 1937.　　　S. T. FREAS ET AL　　　2,069,140
BEET KNIFE SHARPENING MACHINE
Filed Feb. 14, 1934　　　8 Sheets-Sheet 1
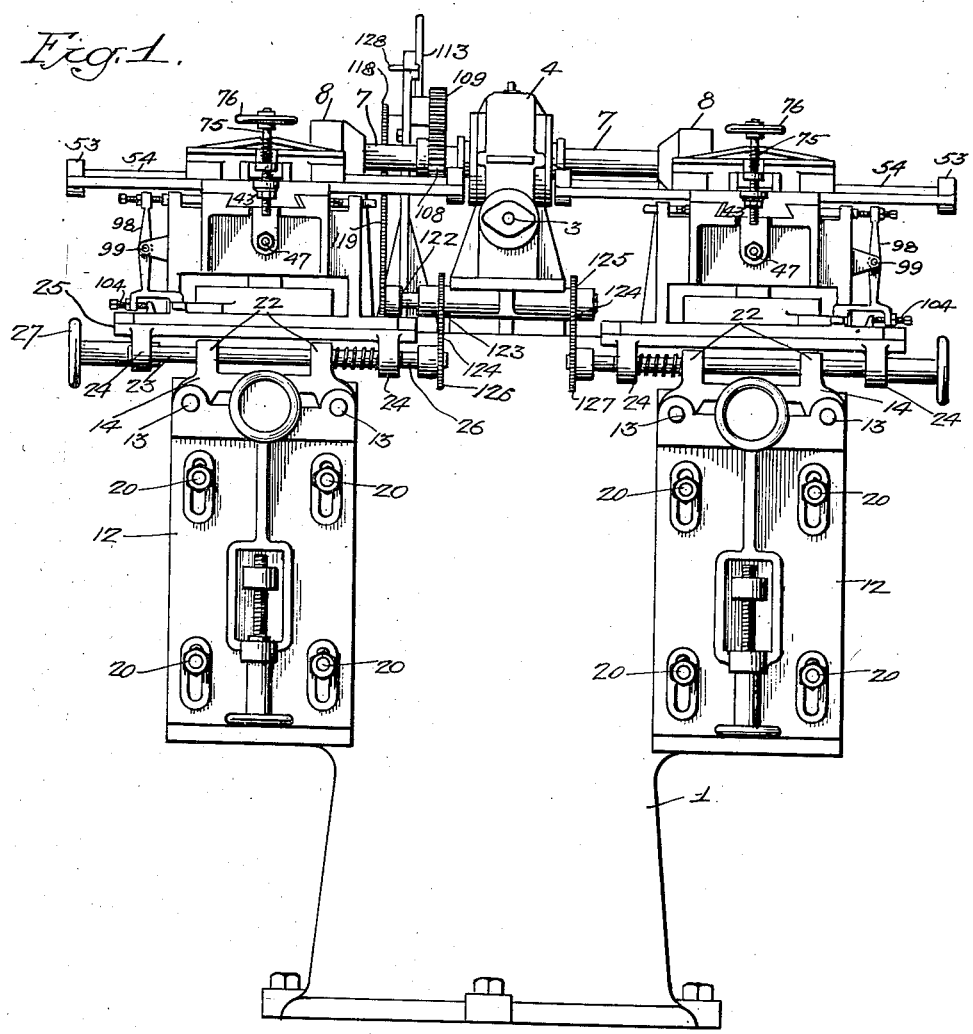
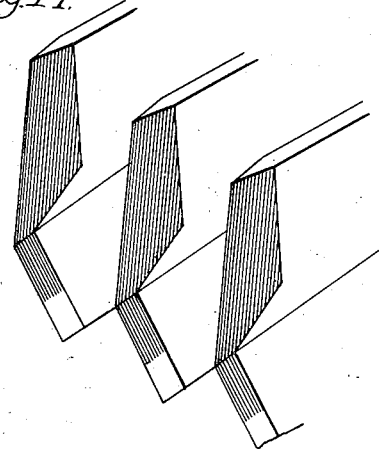
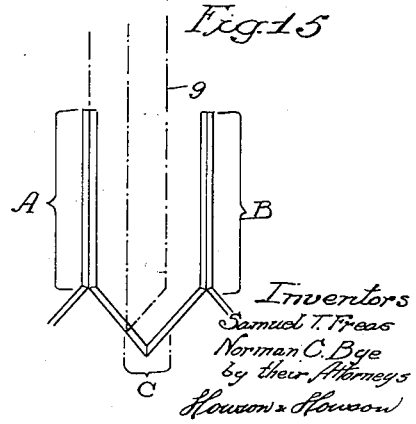
Inventors
Samuel T. Freas
Norman C. Bye
by their Attorneys
Howson & Howson

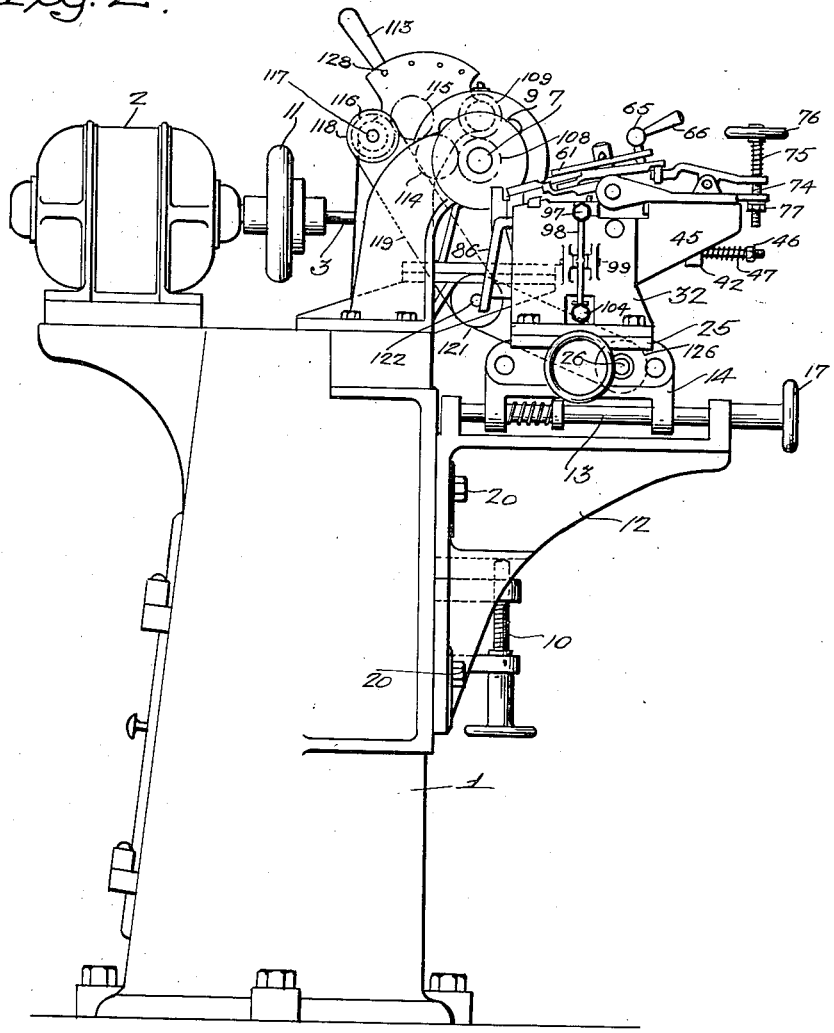

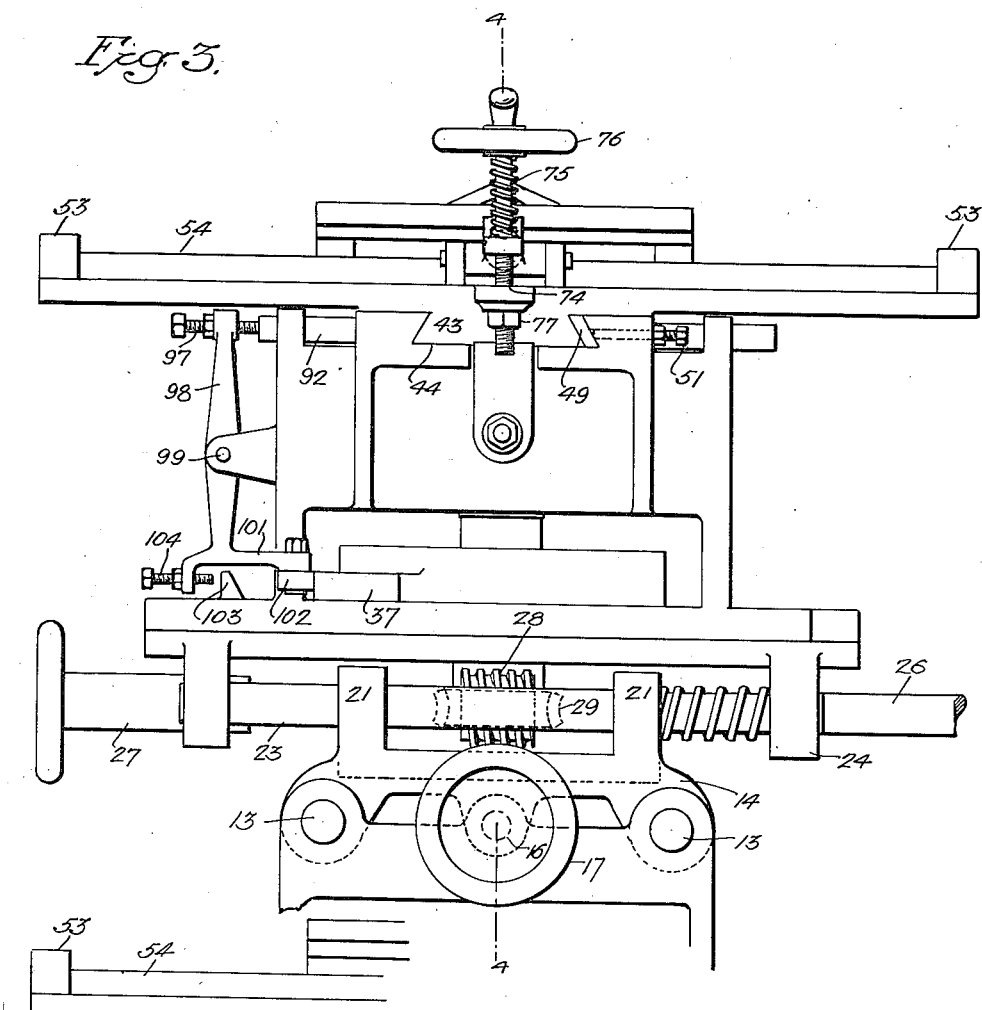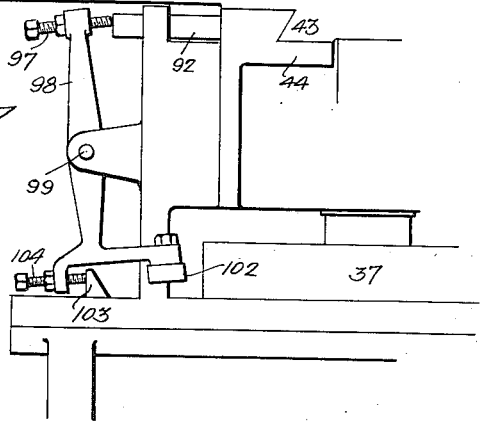

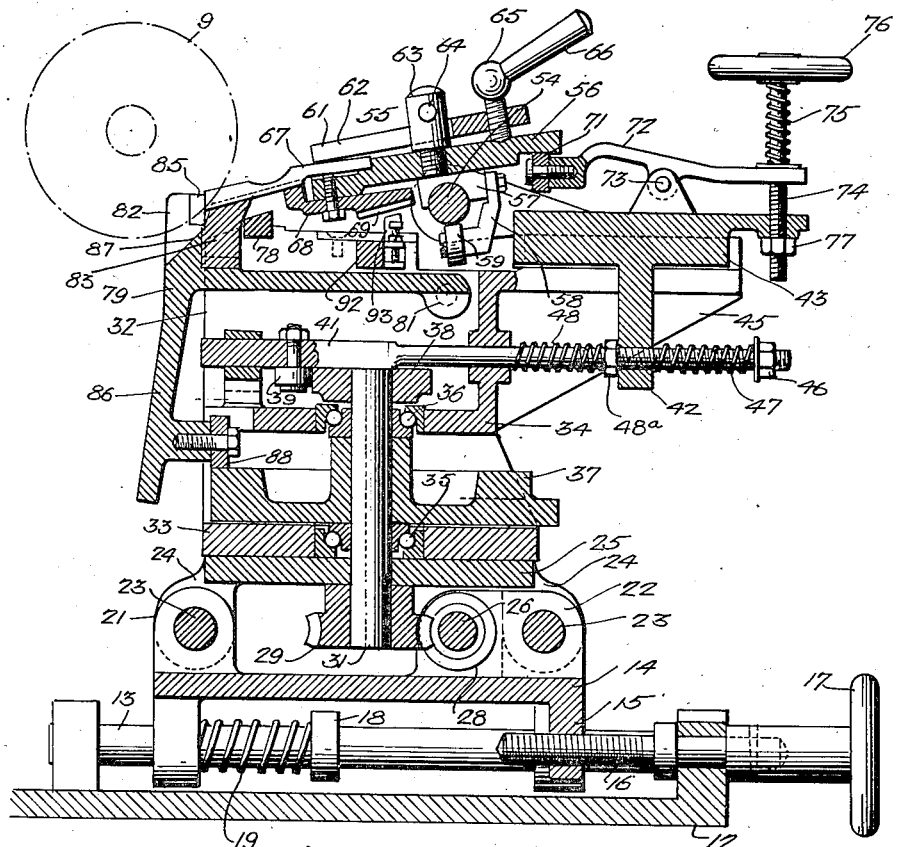

Jan. 26, 1937.  S. T. FREAS ET AL  2,069,140
BEET KNIFE SHARPENING MACHINE
Filed Feb. 14, 1934  8 Sheets-Sheet 5

Inventors:-
Samuel T. Freas
Norman C. Bye
by their Attorneys
Howson & Howson

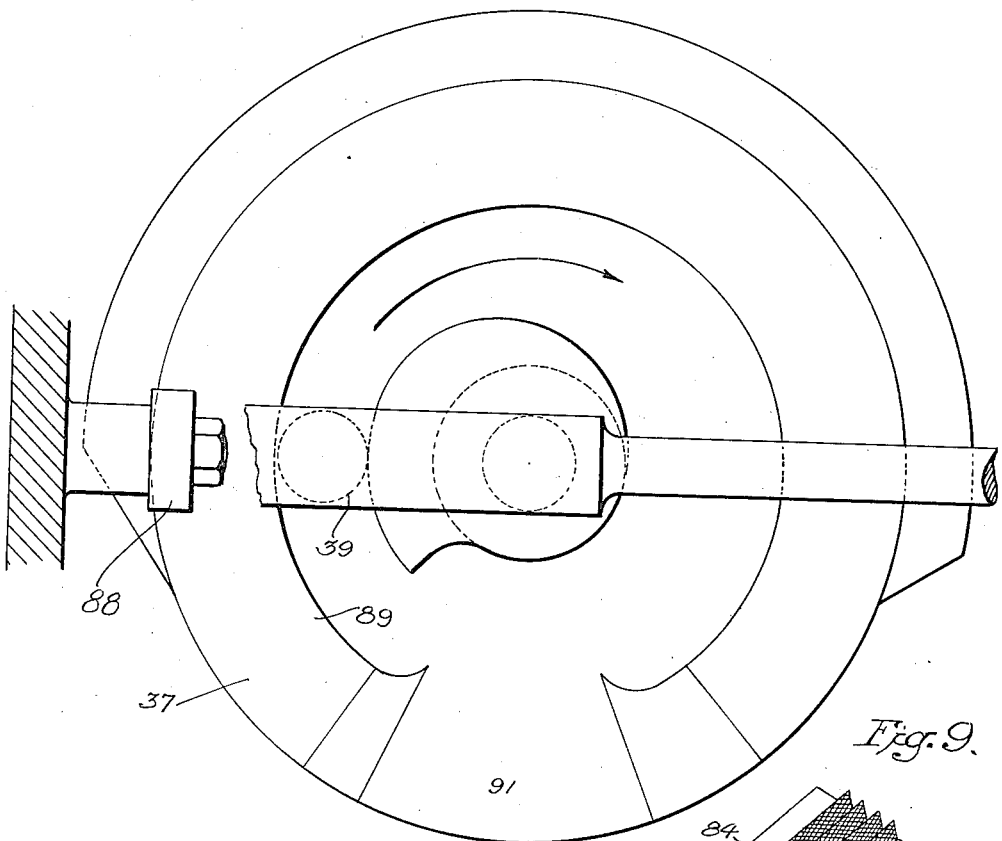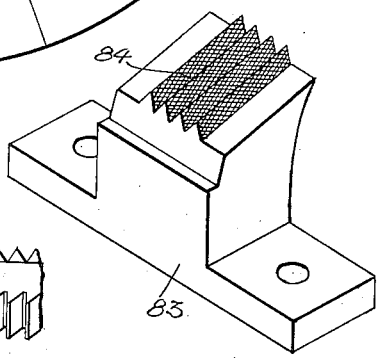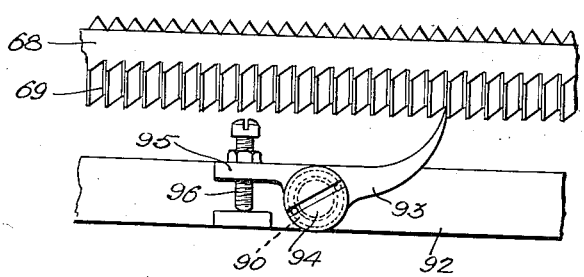

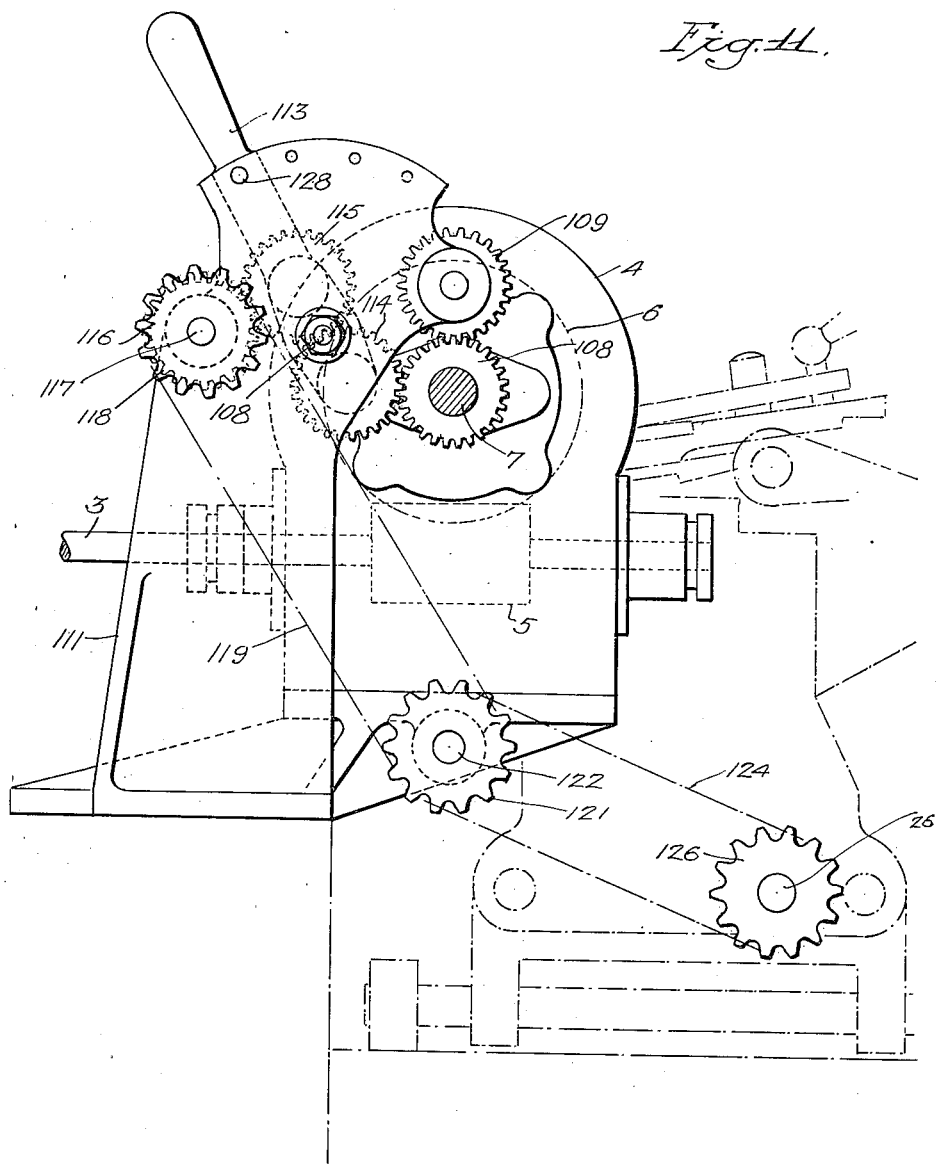

Patented Jan. 26, 1937

2,069,140

UNITED STATES PATENT OFFICE 2,069,140

BEET KNIFE SHARPENING MACHINE

Samuel T. Freas, Trenton, N. J., and Norman C. Bye, Philadelphia, Pa., assignors to Henry Disston & Sons, Incorporated, Tacony, Pa., a corporation of Pennsylvania Application February 14, 1934, Serial No. 711,246

27 Claims. (Cl. 76—82)

A principal object of this invention is to provide a machine capable of efficiently and accurately sharpening beet knives, and while the machine herein illustrated is primarily adapted for sharpening this type of knife, it will be apparent that in principle the invention is applicable to machines for sharpening cutting blades of other forms.

The invention resides in the structural and mechanical details and features of the machine hereinafter fully set forth and illustrated in the attached drawings, in which:

Figure 1 is a front elevation of a machine made in accordance with our invention;

Fig. 2 is a side elevation of the machine;

Fig. 3 is an enlarged front elevation of one of the working heads of the machine;

Fig. 4 is a section on the line 4—4, Fig. 3;

Fig. 5 is a fragmentary sectional view corresponding to Fig. 4 and showing certain of the elements of the mechanism in alternative relative positions;

Fig. 7 is a fragmentary elevational view illustrating a detail of the mechanism;

Fig. 8 is a fragmentary sectional view illustrating another detail of the mechanism;

Fig. 9 is a detached perspective of the micrometer adjustment block which constitutes an important element of the invention;

Fig. 10 is a fragmentary view illustrating a further detail of the mechanism;

Fig. 11 is a fragmentary sectional view on the line 11—11, Fig. 1;

Fig. 14 is an enlarged fragmentary perspective view showing the sharpened cutting edges of a beet knife, and Fig. 15 is an enlarged fragmentary elevation of the cutting edge of the beet knife illustrating the manner in which the cuts are made.

Figure 6:
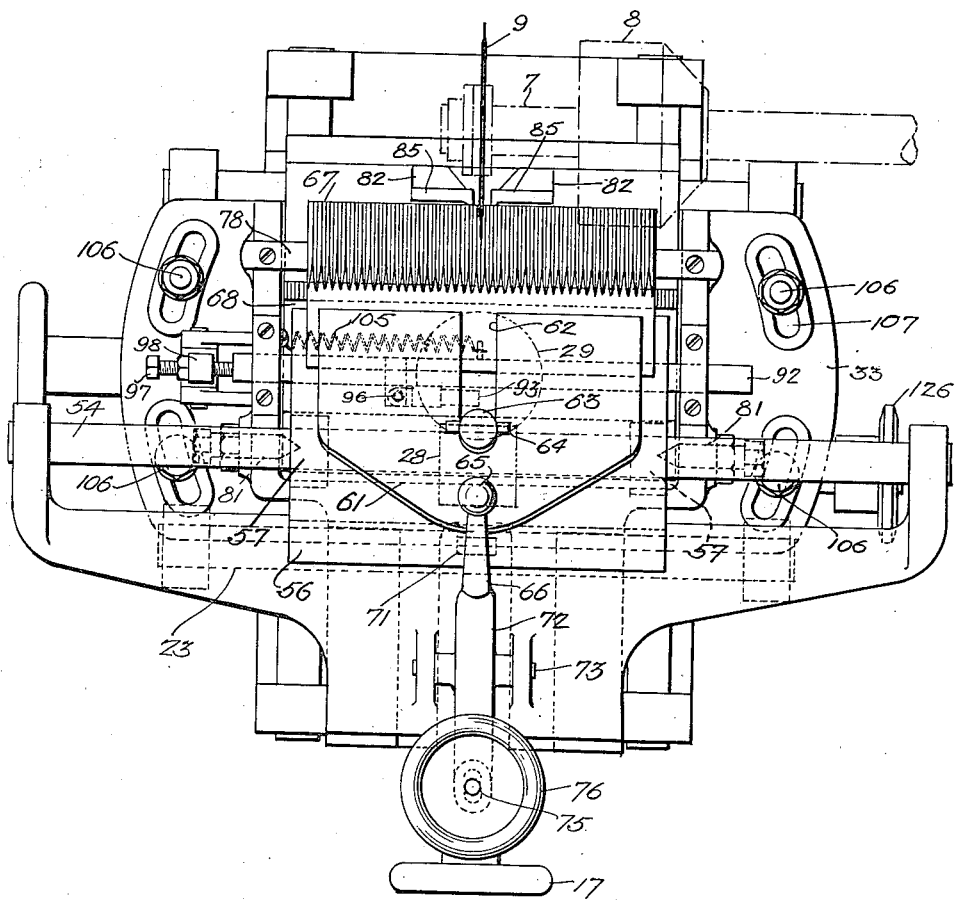
Fig. 6 is a plan view of the working head shown in Fig. 3.

Referring to Figs. 1 and 2 of the drawings, the machine forming the subject of our invention may comprise in a preferred form a base or supporting structure 1 formed in the present instance as a hollow casing. Mounted at the top of the base structure 1 is an electric motor 2 which is connected through the medium of a shaft 3 to transmission gearing mounted within a casing 4, this casing being located in the present instance approximately at the middle of the forward side of the base structure. As indicated in broken lines in Fig. 11, the shaft 3 carries a worm 5 positioned within the casing 4 which meshes with a worm wheel 6, and this worm wheel is fixed to a shaft 7 which projects transversely through the opposite side walls of the casing 4 and has its ends journaled in bearings 8, 8 at the top of the base structure. On each end of the shaft 7 is mounted in the present instance a rotary file 9, which files constitute the preferred form of cutting tool employed in the sharpening operations, although other tools such for example as emery wheels may be desirable for certain characters of knives. A hand wheel 11, see Fig. 2, is provided on the shaft 3 intermediate the motor 2 and the gear box 4 permitting rapid deceleration of the mechanism by friction applied by hand to the said wheel.

Extending from the forward side of the base structure 1 and in a position at each side thereof substantially in alignment with the ends of the shaft 7 is a bracket 12, see Figs. 1 and 2. These brackets constitute supports for what may be termed the working heads of the machine comprising the work holders and the mechanism whereby the work is presented to the rotary files for sharpening. The brackets are adjustable vertically by means of a screw and hand wheel 10, and are locked in adjusted positions by bolts 20. Since the working heads are identical in form and operation and constitute a mere duplication in the machine, a description of one will suffice for the other.

The bracket 12 carries at its upper end a pair of spaced parallel rods 13, 13 which constitute a sliding support for a member 14 constituting the base element of the working head. The member 14 as shown in Fig. 4 has at its forward side a depending lug 15 having a threaded aperture for reception of a screw shaft 16 which is journaled for rotation in the bracket 12 and has at its forward end a hand wheel 17 by means of which the said shaft may be rotated to adjust the position of the member 14 upon the supporting rods 13. One or both of the rods 13 carries a collar 18 which forms a bearing for one end of a spring 19 mounted on the rod 13 and bearing at its other end against a depending portion of the member 14 through which the said rod extends. The spring is under continuous compression regardless of the position of the member 14 upon the supporting rods, and functions to take up any lost motion between the threads of the shaft 16 and the interengaged threads of the member 14.

The member 14 has two aligned pairs of upstanding lugs 21, 21 and 22, 22, these lugs being apertured for reception of a pair of rods 23, 23, which rods are secured in depending lugs 24, 24 upon a plate 25, this plate thereby being adjustable with respect to the supporting member 14. A screw shaft and hand wheel 27 is journaled in a depending portion of the plate 25 and has threaded engagement with the member 14, through the medium of which the plate 25 may be adjusted longitudinally of the rods 23 and with respect to the member 14; and springs 30 on the rods 23 react upon the lugs 24 of the plate 25 and the adjoining lugs 21 of the member 14 and take up any lost motion in the adjusting screw. It will be noted that the rods 13 and 23 extend transversely with respect to each other whereby adjustment of the adjustable plate 25 is made possible both longitudinally and transversely of the base structure 1, and in directions both paralleling and perpendicular in the horizontal direction to the file shaft 7.

The lugs 22 of the member 14, as shown in Fig. 4, also constitute journals for a rotary shaft 26, which shaft is connected at one end by transmission mechanism, hereinafter described, to the shaft 7. The shaft 26, as shown in Fig. 3, carries a worm 28 which meshes with a worm wheel 29, see Fig. 4, which wheel is carried at the lower end of a vertical shaft 31. This shaft 31 is suitably journaled in a structure that comprises upright side plates 32 connected by transverse bars 33 and 34 which structure is adapted to swivel on the plate 25 about the axis of the shaft 31 for a purpose hereinafter set forth. The bars 33 and 34 in the present instance support antifriction bearings 35 and 36 for the shaft 31.

The shaft 31 carries intermediate the transverse bars 33 and 34 a cam 37, and carries at its upper end a second cam 38 which engages a roller 39 upon a rod 41 slidably supported in the said structure 32—34. The rod 41 extends transversely through a depending arm 42 of a member 43 slidably supported in a dovetailed guide 44 on an extension 45 of the structure 32—34. That end of the rod 41 which passes through the arm 42 of the slidable member 43 is threaded for reception of a nut 46, and a coiled spring 47 on the rod is confined between this nut and the adjoining side of the arm 42. A second spring 48 also carried by the rod is confined between a nut 48a on the rod 41 at the opposite face of the depending arm 42 and an adjoining surface of the structure 32—34. The tension of these springs may be regulated by adjustment of the nuts 46 and 48a on the threaded stem, and they function jointly to maintain the roller 39 in contact with the surface of the cam 38, and also to resiliently maintain a normal operative relation between the depending arm 42 of the member 43 and the rod 41. It will be apparent that rotation of the shaft 31 results in a reciprocation in the dovetail guide 44 of the member 43.

As shown in Fig. 3, a liner 49 is provided in the dovetail joint which may be adjusted through the medium of a set screw 51 to take up wear developing in the guide between the relatively movable parts.

As shown in Fig. 3, the member 43 is extended transversely from the sides of the dovetail, and at each end of the extended portion is provided with a pair of rearwardly extending arms 53. Supported in and extending between these arms is a rod or shaft 54 which constitutes a bearing for a work carrier 55. This carrier comprises a plate 56 having depending recessed bearing lugs 57 at each end which rest upon and partially embrace the rod 54. Depending from each of the lugs 57 is an arm 58 which carries a roller 59 engaging the under side of the rod 54, see Fig. 4, whereby the carrier 56 is slidably held in position upon the rod. The carrier further comprises a clamping plate 61 having a slot 62 extending inwardly from its rear edge for reception of a retaining pin 63 which extends upwardly from the plate 56. This pin has transverse extensions 64 overlying the plate 61 and preventing elevation of the mid portion of the plate. The clamping plate 61 has threaded into its forward portion a clamping screw 65 provided with a handle 66, this screw when turned down upon the plate 56 fulcruming the plate 61 on the abutments 64 of the pin 63, thereby forcing the rear end of the plate 61 downwardly towards the plate 56. The rear edge of the plate 56 is provided with a recess for reception of the work, which in the present instance is shown as a beet knife 67, and when the rear end of the plate 61 is forced down upon that portion of the beet knife which rests in the recess of the plate 56, the said knife is solidly clamped to the last-named plate.

Secured to the under side of the plate 56 at its rear edge is a member 68, the rearward end of which turns upwardly to form a rest for the under side of the knife 67, and the knife is clamped down upon this support through the medium of the clamping plate 61 as previously set forth. The member 68 extends the full width of the plate 56, see Fig. 6, and the upper surface of the upturned rearward portion which constitutes a bearing for the beet knife 67 is serrated to correspond with the serrations at the under side of the beet knife. When the knife, therefore, is clamped in position as described, it is positively held against transverse movement by the registering serrations of the member 68 and the contacted portions of the knife. The forward end of the member 68 designated in Fig. 4 by the reference numeral 69 is formed on its under side as a rack, see Fig. 10; and pawl mechanism is provided as hereinafter set forth adapted for cooperation with this rack to traverse the carriage 56 intermittently on the supporting rod 54.

The forward end of the plate 56 is engaged at its under surface by a roller 71 carried at one end of a lever 72 pivotally mounted at 73 on the member 43. A screw 74 is threaded into the member 43 and passes through an opening at the rear end of the lever 72, and a spring 75 mounted on the screw 74 is confined between the upper surface of the lever 72 and the head 76 of the screw, said spring thereby exerting a pressure tending to depress that end of the lever which it engages and to thereby elevate the roller 71 against the under side of the plate 56. Adjustment of the pressure of the spring 75 upon the lever is effected by adjustment of the screw 74 in the member 43, and a lock nut 77 holds this screw locked in adjusted position. The spring 75 tends as set forth to elevate the front end of the plate 56 and to thereby bring the beet knife 67 downwardly into contact with a guide bar 78 extending between the side plates 32.

The bar 78 is so relatively positioned with respect to the rotary file 9 that when the carrier 56 is turned on the shaft 54, as described, to bring the beet knife into engagement with the said bar, see Fig. 5, the knife lies clear of the file. Means is provided for elevating the knife and for properly positioning the cuttings edges of the knife which are to be sharpened with respect to the file surfaces. This elevating and positioning device comprises a member 79 pivotally supported between the side plates 32, the said pivotal support in the present instance taking the form of a pair of trunnion pins 81, see Fig. 6, threaded into the said side plates 32 and having tapered ends entering recesses at the opposite sides of the member 79. The member 79 carries at its rear edge portion and substantially centrally thereof a pair of upstanding lugs 82, 82 spaced apart a sufficient distance to permit passage therebetween of the rotary file 9, and inwardly of these lugs 82 is positioned a block 83, which as shown in Fig. 9 is provided on its upper inclined surface with a plurality of serrations 84 which correspond in angularity and spacing to the serrations on the under side of the beet knife 67. Preferably the faces of the serrations 84 are file-cut, as shown, for a purpose hereinafter set forth. Each of the lugs 82 is recessed at its inner side for reception of a liner block 85, and the disposition of these elements is such that when the member 79 is elevated as shown in Fig. 4 by means hereinafter described, the liner elements 85 constitute limit stops engaging the cutting edge of the knife 67, while the block 83 constitutes a support engaging the under side of the knife 67, and with the elements 85 functioning to definitely and properly locate the knife with respect to the file.

The member 79 comprises at its rear end and below the lugs 85 a depending apron 86, this apron functioning in part to deflect the filings from the interior of the working head, it being noted that between the lugs 82 the intermediate surface 87 of the member 79 is inclined downwardly and rearwardly to deflect the filings to the outer surface of the apron 86. The apron 86 also carries adjacent its lower end a roller 88 which engages the cam 37, and this cam when rotated functions to intermittently raise and lower the member 79. The working face of the cam 37 engaged by the roller 88 is shown in Fig. 8, the portion designated by the reference numeral 89 constituting the elevated portion of the cam, while 91 indicates the depressed portion of the cam intermediate the ends of the elevated portion 89.

Figure 13:
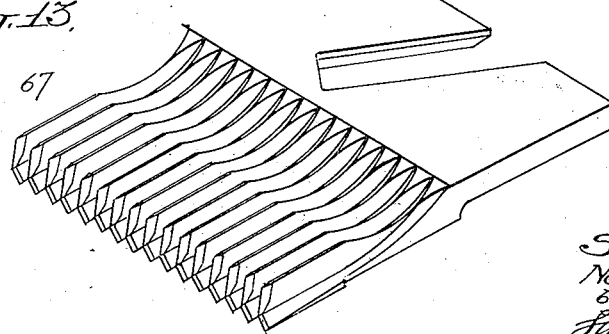
Fig. 13 is a view in perspective of a known form of beet knife.

The pawl mechanism for intermittently traversing the work carrier 55 comprises a bar 92 slidably mounted in the structure 32—34, which bar as shown in Figs. 4 and 10 carries a pawl 93 positioned to engage the rack 69. The pawl is pivoted to the bar 92 at 94 and is elevated into contact with the rack by a coiled spring 90 on the pivot. A set screw 96 provides for adjustment of the end of the pawl with respect to the rack. The rod 92, see Figs. 3 and 7, is engaged at one end by a set screw 97 threaded into the upper end of a lever 98 pivotally mounted intermediate its ends at 99 to projecting lugs on the structure 32—34. At its lower end, the lever 98 has a transversely projecting arm 101 which carries a roller 102 positioned to engage the vertical face of the cam 37. A relatively fixed lug 103 on the carriage and a set screw 104 adjustable in the lower end of the lever 98 provide adjustment for regulating the stroke of the lever 98 with respect to the pawl bar 92 under action of the cam 37. The peripheral contour of the cam 37 is illustrated in Fig. 8, the roller 102 being shown in its innermost position with respect to the axis of the cam determined by the adjustment of the set screw 104, as illustrated in Fig. 3. It will be apparent that as the cam 37 rotates, the lever 98 will be oscillated to an extent corresponding to the distance between the set screw 104 and the lug 103. A spring 105, see Fig. 6, tends to retain the pawl bar 92 resiliently in engagement with the opposed end of the set screw 97, so that oscillation of the lever 98 as described results in a corresponding reciprocatory movement of the pawl bar 92 and a consequent intermittent traversing movement of the carriage 56. It will be noted with reference to Fig. 10 that the teeth on the rack 69 correspond in pitch to the serrations of the member 68 which in turn correspond to and normally engage the serrations in the under side of the beet knife 67. As shown in Figs. 13 and 14, these serrations also correspond to the width of the channels on the upper face of the beet knife which extend rearwardly from the cutting edges. When, therefore, the bar 92 is adjusted to advance the carrier 56 to the extent of one rack tooth, the resultant movement of the beet knife 67 will correspond to the width of the channels of the knife.

The operation of the mechanism insofar as described above is as follows: The knife 67 is clamped in the carrier 56 in the manner previously set forth, reasonably accurate positioning of the knife with respect to the file 9 being assured by reason of the character of the clamp including the serrated portion of the member 68 of the carrier which engages in the serrations on the under side of the knife. With the parts in the relative positions shown in Fig. 4, adjustment of the work to and from the file 9 may be effected through the screw 16, while transverse adjustment of the work with respect to the file may be effected through the medium of the hand wheel 27 and the associated screw. Angular adjustment of the work with respect to the file about the axis of the shaft 31 may be effected by release of bolts 106 which pass through segmental slots 107 in the base member 33 and into the plate 25. It is apparent that these means jointly afford a substantially universal adjustment of the work with respect to the file 9. As previously set forth, the traversing movement of the tool 67 through the medium of the pawl 93 and ratchet 69 may be regulated as required by means of the set screws 97 and 104.

In Fig. 4, the beet knife 67 is shown in contact with the file 9. The relative positions of the various cams and their cooperating rollers are shown in Fig. 8, and it will be noted that the roller 39 is riding on what may be termed the top of the cam or the portion thereof of greater radius. As the movement of the cams progress in the direction of the arrow, the roller 39 passes over the shoulder of the cam, which releases the rod 41 and permits the spring 48 to carry this rod to the right, and with it the member 43 and the carrier 56. This movement withdraws the beet knife upon the supporting block 83 from the file 9, but does not clear the work from the forward edge of the said block 83; and this movement of the knife in contact with the block 83, and by reason of the file-cut surfaces of the serrations 84, has the effect of trimming the cutting edges of the knife from the under side. Immediately after the release of the roller 39, the roller 88 passes downwardly onto the lower portion 91 of the cam 37, with the result that the beet knife 67 is lowered onto the guide bar 78, while the rack 69 is also moved downwardly into engagement with the pawl 93. The relative positions of the parts at this stage in the cycle of operations are shown in Fig. 5. While the elements are in this position, the side surface of the duplex cam 37 engages the roller 102 of the traversing mechanism and actuates the pawl to traverse the carrier 56 to an extent necessary to bring a succeeding edge portion of the beet knife 66 into proper relative position with respect to the file 9. Following this traversing movement, the cam 37 again elevates the member 79 into its original position as shown in Fig. 4, which also by engagement of the block 83 with the under side of the beet knife 67 elevates the latter by oscillating the carrier 56 around the shaft 54. Following elevation of the member 79 to its original position, the cam 38 operates to draw the rod 41 to the left, see Fig. 4, which advances the member 42 and the carrier 56 until the beet knife engages the blocks 85, which brings the knife into engagement with the file 9 for the next cutting operation. Movement of the rod 41 to the left in excess of that required to bring the edge of the beet knife against the blocks 35, is taken up in the spring 47. It will be noted by reference to Fig. 6 that the blocks 85 are so formed that they engage only the channel walls immediately adjoining the two walls on and between which the file 9 is operating, and the faces of the blocks may to advantage be slightly recessed to receive the contacting wall edges.

It will be noted that as soon as the rack 69 is elevated from the pawl 93 by the upward movement of the member 79, the carrier 56 is free for movement in either direction on the rod 54. The spring 75 forces the beet knife at this time firmly down upon the serrated upper surface of the block 83, and by reason of the fact that the serrations on the block and on the under side of the knife 67 are identical, the knife tends to center itself in the serrations of the block by adjustment of the carrier 56 axially of its supporting rod 54. Since the block 83 is definitely positioned with respect to the file 9, this self-adjusting action of the work on the block 83 has the effect of a micrometer adjustment, correcting any slight error in pawl adjustment or action and insuring a correct positioning of the work with respect to the cutting tool.

The cutting operation proceeds until such time as the roller 39 is again freed by the cam 38, whereupon the work is again withdrawn from the cutter, the member 79 again lowered to bring the work upon the bar 78 and to clear the work from the block 83, and the traversing of the carrier 56 follows with a subsequent re-elevation of the member 79 and an advance of the work into re-engagement with the file. It is to be noted that the member 79 with the block 83 functions to definitely locate the work during the cutting operation with respect to the file 9, and that this positioning of the work with respect to the tool is a positive one independent of minor variations in the traversing and feeding mechanism.

The general form of the beet knife is illustrated in Fig. 13, and the manner in which the edges are sharpened is illustrated in Figs. 14 and 15. In sharpening the knives, it has been found desirable, particularly in field work, to employ three distinct cutting operations for each channel of the knife. Thus, with reference to Fig. 14, the shaded portion of the kerf may indicate one cutting operation of the tool. A second operation embraces the corresponding area at the opposite side of the channel, and the third cut embraces the central portion of the V-shaped bottom portion of the channel untouched by the preceding cuts. In Fig. 15, these three areas are designated by the reference characters A, B and C and this figure also illustrates the manner in which the file 9 is brought into engagement with the knife in the cutting operation. It is preferred, though not essential, that the cutting operations at A and B be conducted in advance of the cut C in the bottom of the channel. This method of sharpening permits use of one size of cutter for different sized knives.

In work performed in the shop and in forming the original cutting edges on new knives, the sharpening may be effected in two operations, using a special cutting tool which embraces in a single pass one entire side of a channel from the upper edge to the bottom of the V. If desired, this procedure may be preceded by a routing step to thin the bottom wall of the channels at the front edge.

Figure 12:
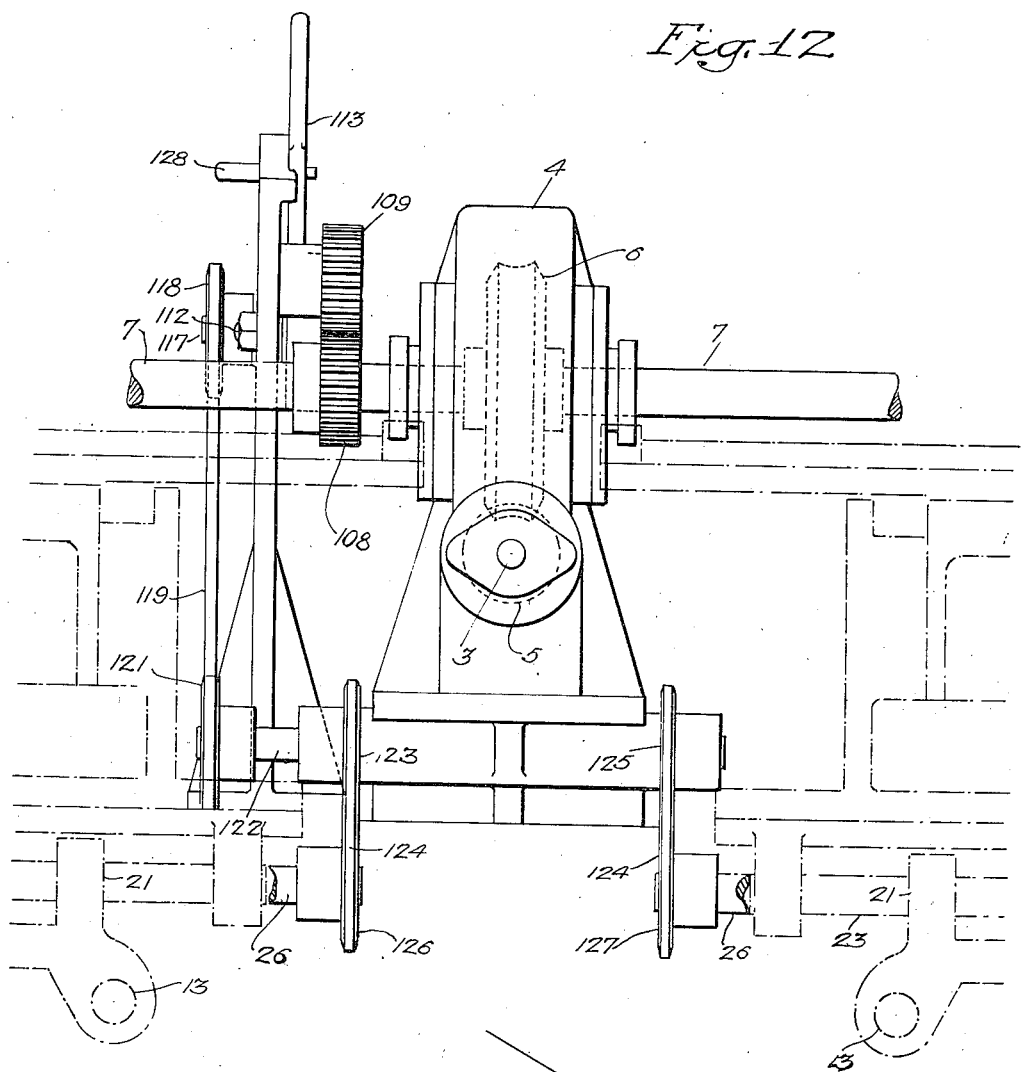
Fig. 12 is an elevational view of that portion of the mechanism illustrated in Fig. 11.

In the three-step operation first described, we have found that the best results are obtainable in making the cuts indicated by the reference letters A and B to rotate the file in a counterclockwise direction, reference being had to Fig. 14; and to reverse the rotation of the file for the cut C in the bottom of the channel. To provide for this reversal of the cutter 9, we preferably employ a reversible electric motor 2, and in order that reversal of the motor may not also reverse the normal progressive feeding of the work with respect to the file 9, we provide in the operative connection between the shaft 26 and the shaft 7, previously mentioned, a reversing gear illustrated in Figs. 11 and 12. As therein illustrated, the shaft 7 carries a gear 108 which meshes with a gear 109 journaled on a supporting bracket 111 on the base structure. Pivotally mounted on the bracket 111 at the point designated 112 is a lever 113. This lever carries a pair of intermeshing pinions 114, 115, the pinion 114 being adapted to mesh with the gear 108, as shown in Fig. 11, and when the lever 113 is swung to an alternative position to the right is adapted to mesh with a gear 116 also journaled in the bracket 111. The pinion 115 in the alternative operative positions of the pinion 111 meshes either with the gear 116 or the gear 109. As shown in Fig. 11, the pinions 114 and 115 mesh respectively with the gears 108 and 116, which effects a rotation of the gear 116 in a predetermined direction. By shifting the lever 113 to the right, however, the gears 114 and 115 may be caused to mesh respectively with the gears 116 and 109, with the result that the direction of rotation of the gear 116 is reversed. The gear 116 is mounted on a shaft 117 which carries a sprocket 118, this sprocket being connected by a chain 119, indicated in broken lines, with a sprocket 121 on a jack shaft 122 journaled in an extension of the bracket 111. This shaft carries sprockets 123 and 125 which are connected through sprocket chains 124 with sprockets 126 and 127 on the worm shafts 26 of the respective working heads. This device constitutes a simple and effective reverse gear mechanism whereby the direction of rotation of the worm shafts of the working heads may be reversed in accordance with the reverse rotation of the file 9 as previously described. As shown in Fig. 11, the lever 113 is provided with detent means indicated by the reference numeral 128 by means of which this lever may be retained in either of its operative positions or in a neutral position in which the pinions 114 and 115 are out of mesh with any of the gears 108, 109 and 116.

It will be understood that there may be considerable modification without departure from the essential features of the invention as defined in the appended claims.

We claim:

1. In a machine of the stated character, the combination with a cutter operative in a fixed path, of an adjustable work carrier, mechanism for traversing the carrier with respect to the cutter including a reciprocatory carrier-engaging member movable in a fixed path, and means for adjusting the work into engagement with the cutter, said means including an element adapted successively to release the carrier from said carrier-engaging member and to guide the work into engagement with the tool.

2. In a machine of the stated character, the combination with a rotary cutter, of a work carrier, mechanism for advancing and retracting said carrier and for traversing the carrier with respect to the cutter, resilient means operative on the carrier to lower the work from the cutter, and a member operative in synchronism with the carrier-actuating mechanism to periodically elevate the work and to guide the work into engagement with the cutter.

3. In a machine of the character set forth, the combination with a cutting tool, of a work carrier, mechanism operative to advance and retract said carrier to and from the tool and to traverse the carrier transversely of the tool when in the retracted position, and means for guiding the work into engagement with the tool, said means including a work-engaging element operative to elevate and lower the work with respect to the tool in synchronism with said carrier-actuating mechanism.

4. In a machine of the stated character, the combination with a rotary cutter, of a work carrier, means for adjusting the carrier to lower the work from the cutter, traversing mechanism engaging the carrier when the work is thus lowered to traverse the work with respect to the cutter, and a guide adapted to elevate the work and to simultaneously release the carrier from said traversing mechanism, said guide comprising means for accurately locating the work with respect to the cutter.

5. In a machine for sharpening serrated beet knives, the combination with a rotary cutter, of a work carrier, means for adjusting said carrier to lower the work from the cutter, traversing mechanism including an actuating pawl adapted to engage the carrier when the work is lowered, and elevating means for the carrier operative to release the carrier from the said pawl and including a member cooperative with the serrated under side of said knife to accurately locate the knife with respect to the cutter.

6. In a machine of the stated character, the combination with a rotary cutter, of a carriage movable toward and from said cutter, a work carrier mounted for oscillation on said carriage and movable transversely in said carriage and with respect to the cutter, guide means for said work adapted in elevated position to accurately position the work with respect to the cutter, mechanism for synchronously actuating the carriage and said guide means whereby the said work is retracted and lowered from said cutter, a transverse guide limiting the downward movement of the work and permitting withdrawal of the guide means from the work, traversing mechanism operatively engaging the carrier when the said work is lowered, and mechanism for actuating said traversing means in synchronism with the carriage and guide-actuating mechanism.

7. The combination with a cutting tool, of an oscillatory work carrier, an adjustable guide for supporting and accurately positioning the work with respect to the tool, a relatively fixed guide for supporting the work in a position removed from the tool, means for actuating the adjustable guide to lower the work onto said fixed guide, and traversing mechanism positioned to engage the carrier when the tool rests upon the fixed guide.

8. The combination with a cutting tool, of an adjustable work carrier, a fixed guide adapted to support the work in a position removed from said tool, an adjustable guide for elevating the work from said fixed guide and for guiding it into engagement with the tool, traversing mechanism operatively connected with the carrier when the work rests on the fixed guide and disconnected from the carrier when the work is elevated by said adjustable guide, and means on said adjustable guide for accurately transversely positioning the work with respect to the tool following disconnection of said carrier from the traversing mechanism.

9. The combination with a cutting tool, of an adjustable work carrier, means for adjusting said carrier to and from the tool, said adjusting means comprising an actuating element resiliently connected with said carrier, and a work-supporting guide comprising abutments located at opposite sides of the cutter for engaging the forward edge of the work as it is advanced toward the tool to thereby limit said advance movement, said resilient means compensating for movement of said actuating element in excess of the movement of said carrier.

10. The combination with a cutting tool, of an adjustable work carrier, guide means supporting the work in engagement with the tool, means for traversing the carrier and for adjusting said guide means to remove the work from the tool during said traversing movement, and means on said guide operative to accurately adjust the work in the traversing direction and independently of said traverse mechanism.

11. In a machine for sharpening serrated beet knives, the combination with a cutting tool, of an adjustable carrier for the said knife, mechanism for adjusting the carrier to traverse the knife and to advance and retract the knife with respect to the knife, means for guiding the tool into engagement with the tool, said means comprising abutment means for the cutting edge of said knife limiting the advance movement of the knife towards the tool, and a support for the knife having serrations corresponding to the serrations at the under side of the knife and engaging the latter, substantially as described.

12. In a machine for sharpening serrated beet knives, the combination with a cutting tool, of a carrier adapted for traversing movement transversely of the tool, and means for transversely adjusting the carrier independently of the traversing mechanism, said means including a work-supporting member having serrations corresponding with and engaging the serrations on the under side of said knife.

13. In a machine for sharpening serrated beet knives, the combination with a cutting tool, of a carrier adapted for traversing movement transversely of the tool, means for transversely adjusting the carrier independently of the traversing mechanism, said means including a work-supporting member having serrations corresponding with and engaging the serrations on the under side of said knife, and means resiliently forcing said knife downwardly upon said work-supporting member.

14. In a machine of the stated character, the combination with a cutting tool, of a work carrier comprising a main carriage, a supporting framework constituting a guide for said carriage on which the carriage is movable to and from said cutter, a work carrier adjustably mounted on said carriage and movable transversely thereof and with respect to the tool, traversing mechanism for said carrier mounted in the frame, guide means for the work also adjustable in the frame, a vertical shaft journaled in said frame, means associated with said shaft for actuating the carriage, the traversing mechanism and said guide, a support for said frame upon which said frame is adjustable around the axis of said shaft, a carriage for said support on which said support is adjustable in a direction transversely of the tool, and an adjustable support for said carriage whereby said carriage is adjustable toward and from the tool.

15. In a machine of the character set forth, the combination with a cutting tool, of a work carrier, mechanism for actuating said carrier to traverse and to advance and retract the work with respect to the tool, mechanism for actuating the tool, a motor operatively connected with the actuating mechanisms both of the tool and the carrier, means for reversing the motor to reverse the direction of movement of said tool, and reverse gear mechanism interposed between the motor and the carrier-actuating mechanism whereby said latter mechanism may be reversed in accordance with the reversal of said motor.

16. In a machine for sharpening serrated beet knives, the combination with a rotary cutter, of a work carrier in which said knife is supported, means for intermittently advancing and retracting the carrier with respect to the cutter to bring different portions of the cutting edge of said work into engagement with the cutter, means for traversing the carrier with respect to the cutter following the retractive movements of the carrier, a common driving means for said cutter and for the carrier-actuating mechanism, and means for reversing the direction of rotation of the cutter while maintaining the same direction of traverse of said carrier.

17. In a machine of the stated character, the combination with a cutting tool and operating means therefor, of a work carrier, means for supporting the carrier in a position wherein the work is removed from the tool to permit traversing the carrier, and means for adjusting the carrier to engage the work with the tool, said means including a guide element predeterminedly positioned with respect to the tool and having portions engaging the under side and cutting edge of the work at points immediately adjacent the tool.

18. In a machine for sharpening serrated beet knives, the combination with a cutting tool and operating means therefor, of a work carrier, means for supporting the carrier in a position wherein the knife is removed from the tool to permit traversing the carrier, traversing mechanism engaging the carrier when in said supported position, said mechanism being disengaged when the carrier is adjusted to elevate the work into engagement with the tool, and means for so adjusting the carrier, said means including a guide element predeterminedly positioned with respect to the tool having a portion engaging the serrated under side of said knife adjacent the part to be contacted by the tool and having serrations corresponding to the knife serrations whereby the knife is accurately positioned with respect to the tool.

19. In a machine for sharpening serrated beet knives, the combination with a cutting tool and operating means therefor, of a work carrier, means for supporting the carrier in a position wherein the knife is removed from the tool to permit traversing the carrier, and traversing mechanism including a serrated element engaged with the serrations on the under side of the knife and having a toothed portion, and a relatively fixed actuator operatively engaging said toothed portion to traverse the carrier.

20. In a machine of the stated character, the combination with a cutter, of an adjustable work carrier, mechanism for traversing said carrier with respect to the cutter to approximately position the work for successive cutting operations, and a work-engaging member operative on the carrier through the work and independently of the carrier-traversing mechanism to accurately adjust the work with respect to the cutter in line with said traverse movement.

21. In a machine of the stated character, the combination with a cutter, of an adjustable work carrier, mechanism for traversing said carrier with respect to the cutter to approximately position the work for successive cutting operations, and a work-engaging member operative independently of the carrier-traversing mechanism to accurately adjust the work with respect to the cutter in line with said traverse movement.

22. In a machine of the stated character, the combination with a cutter, of an adjustable work carrier, mechanism for traversing said carrier with respect to the cutter to approximately position the work for successive cutting operations, means for locating the work on the carrier with respect to the traverse mechanism, and means operative on the carrier through the work and subsequent to each actuation of said traverse mechanism for accurately determining the traverse position of the work with respect to the cutter.

23. In a machine of the stated character, the combination with a cutter, of an adjustable work carrier, mechanism for traversing said carrier with respect to the cutter to approximately position the work for successive cutting operations, means for locating the work on the carrier with respect to the traverse mechanism, and means independent of the said traverse mechanism for accurately determining the traverse position of the work with respect to the cutter, said means comprising an element engageable with the work at a point immediately adjacent the cut, and means associated with said element for effecting a traverse adjustment of the carrier independently of the traverse mechanism.

24. The combination with a cutting tool, of an adjustable work carrier, mechanism for intermittently traversing the carrier with respect to the tool, mechanism synchronized with the traverse mechanism for adjusting the carrier to and from the tool, said adjusting mechanism comprising an actuating element resiliently connected with the carrier, means cooperative with said adjusting mechanism for guiding the work to the tool, said guide means comprising an abutment for the work determining the advanced position of the carrier, and said resilient means compensating for movement of said actuating element in excess of the movement of said carrier.

25. The combination with a cutting tool, of an adjustable work carrier, mechanism for traversing the carrier with respect to the tool, and mechanism for adjusting the said carrier to advance and retract the work into engagement with and from the tool, said last-named mechanism comprising a work-engaging element for elevating and lowering the work with respect to the tool and having means operative in the elevated position of said element to accurately guide the work into engagement with the tool, and means for limiting the downward movement of the work from the tool to permit retraction of said element from the work as said element approaches its lower position.

26. The combination with a cutting tool, of an adjustable work carrier, means for adjusting said carrier to and from the tool, said adjusting means comprising an actuating element resiliently connected with said carrier, and means for guiding the work into engagement with the tool, said guide means comprising a work-supporting element having abutments located at opposite sides of the tool for engaging the forward edge of the work as it is advanced toward the tool to thereby limit said advance movement, and said resilient means compensating for movement of said actuating element in excess of the movement of said carrier.

27. In a machine of the stated character, the combination with a cutter, of an adjustable work carrier, mechanism for traversing said carrier with respect to the cutter to approximately position the work for successive cutting operations, and means operative subsequent to each actuation of said traverse mechanism for accurately adjusting the work with respect to the cutter in line with said traverse movement.

SAMUEL T. FREAS.
NORMAN C. BYE.